(12) United States Patent
Chuang et al.

(10) Patent No.: US 8,907,325 B2
(45) Date of Patent: Dec. 9, 2014

(54) THIN FILM TRANSISTOR HAVING HIGHLY DIELECTRIC ORGANIC LAYER

(75) Inventors: Chiao-Shun Chuang, Hsinchu (TW); Fang-Chung Chen, Hsinchu (TW); Han-Ping David Shieh, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 1118 days.

(21) Appl. No.: 11/924,615

(22) Filed: Oct. 26, 2007

(65) Prior Publication Data

US 2009/0039448 A1 Feb. 12, 2009

(30) Foreign Application Priority Data

Aug. 10, 2007 (TW) ................. 96129596 A

(51) Int. Cl.
| | | |
|---|---|---|
| H01L 29/08 | (2006.01) | |
| H01L 35/24 | (2006.01) | |
| H01L 29/10 | (2006.01) | |
| G02F 1/1335 | (2006.01) | |
| G02F 1/1333 | (2006.01) | |
| G02F 1/1368 | (2006.01) | |
| G02F 1/1362 | (2006.01) | |

(52) U.S. Cl.
CPC .... *G02F 1/133514* (2013.01); *G02F 2202/046* (2013.01); *G02F 2001/136222* (2013.01); *G02F 1/133617* (2013.01); *G02F 1/133345* (2013.01); *G02F 1/1368* (2013.01); *G02F 2202/36* (2013.01)
USPC ................ 257/40; 257/51; 257/57; 257/66; 257/72; 257/E51.005; 257/E51.007; 257/E21.414

(58) Field of Classification Search
CPC ............ H01L 29/66765; H01L 29/517; H01L 51/052; H01L 51/0529; H01L 51/0533; H01L 51/0537
USPC ................. 257/61, 66, 72, E51.005, E51.007
See application file for complete search history.

(56) References Cited

U.S. PATENT DOCUMENTS

| | | | |
|---|---|---|---|
| 4,216,023 A | | 8/1980 | Kinstle |
| 6,107,641 A | * | 8/2000 | Mei et al. ................ 257/66 |

(Continued)

FOREIGN PATENT DOCUMENTS

| | | |
|---|---|---|
| TW | 332263 | 5/1998 |
| TW | I257062 | 6/2006 |

OTHER PUBLICATIONS

"Office Action of Taiwan Counterpart Application", issued on Dec. 30, 2010, p. 1-p. 8, in which the listed reference was cited.

*Primary Examiner* — Jesse Y Miyoshi
(74) *Attorney, Agent, or Firm* — Jianq Chyun IP Office

(57) ABSTRACT

A thin film transistor disposed on a substrate is provided. The thin film transistor includes a gate, a semi-conductive layer, a gate insulator, a source and a drain. The gate insulator is located between the gate and the semi-conductive layer. A light shows a specific color after passing through the gate insulator. The source and the drain are disposed on the semi-conductive layer. A pixel structure and a liquid crystal display panel having the pixel structure are also provided. The liquid crystal display panel can display colorful images without disposing a color filter array additionally so that the manufacturing process of the liquid crystal panel is simple and the manufacturing cost of the liquid crystal panel is low.

15 Claims, 3 Drawing Sheets

(56) References Cited

U.S. PATENT DOCUMENTS

| | | | |
|---|---|---|---|
| 7,129,634 B2 * | 10/2006 | Boroson et al. | 313/504 |
| 7,318,651 B2 * | 1/2008 | Chua et al. | 362/11 |
| 7,528,448 B2 * | 5/2009 | Bailey et al. | 257/352 |
| 7,678,359 B2 * | 3/2010 | Chung et al. | 423/508 |
| 7,791,271 B2 * | 9/2010 | Cok et al. | 313/506 |
| 7,989,153 B2 * | 8/2011 | Skipor et al. | 430/322 |
| 2002/0155729 A1 * | 10/2002 | Baldwin et al. | 438/780 |
| 2005/0104058 A1 * | 5/2005 | Veres et al. | 257/40 |
| 2006/0054885 A1 | 3/2006 | Seo et al. | |
| 2006/0151781 A1 * | 7/2006 | Kim et al. | 257/40 |
| 2007/0099333 A1 * | 5/2007 | Moriya | 438/96 |
| 2007/0236623 A1 * | 10/2007 | Heo et al. | 349/42 |
| 2007/0257256 A1 * | 11/2007 | Kugler | 257/40 |
| 2008/0157065 A1 * | 7/2008 | Krishnamoorthy et al. | 257/40 |

* cited by examiner

THIN FILM TRANSISTOR HAVING HIGHLY DIELECTRIC ORGANIC LAYER

CROSS-REFERENCE TO RELATED APPLICATION

This application claims the priority benefit of Taiwan application serial no. 96129596, filed on Aug. 10, 2007. All disclosure of the Taiwan application is incorporated herein by reference.

BACKGROUND OF THE INVENTION

1. Field of the Invention

The present invention relates to a thin film transistor, a pixel structure and a liquid crystal display panel using the thin film transistor and the pixel structure. In particular, the present invention relates to a thin film transistor and a pixel structure having a color-changing effect or a light-filtering effect, and a liquid crystal display panel using the thin film transistor and the pixel structure.

2. Description of Related Art

In recent years, with great advance in the fabricating technique of electrical-optical and semiconductor devices, flat panel displays (FPDs) have been developed rapidly. Due to the advantages of a liquid crystal display, for example, a low operation voltage, no harmful radiation, light weight, and a compact size, the liquid crystal display gradually replaces the conventional Cathode Ray Tube (CRT) monitors and becomes mainstream.

Generally speaking, a liquid crystal display panel of the liquid crystal displays is constituted by a pixel array substrate, a color filter array substrate and a liquid crystal layer between the two substrates. In addition, another type of liquid crystal display panel is constituted by a pixel array formed on the color filter array substrate, which is array on color filter (AOC), or a color filter array formed on the pixel array substrate, which is color filter on array (COA). The color filter array has a light-filtering effect, so that the liquid crystal display panel can display colorful images.

However, fabricating the color filter array and the pixel array in different processes complicates the manufacturing process of the liquid display panel. Besides, it is impossible to reduce the thickness of the liquid crystal display panel because manufacture of a multiple film layer limits the thickness of the liquid crystal display panel. Moreover, if the color filter array and the pixel array are formed on different substrates respectively, misalignment often occurs in the process of assembling the two substrates. Therefore, how to simplify the manufacturing process and reduce the manufacturing cost is still an important subject in fabricating the liquid display panel.

SUMMARY OF THE INVENTION

The present invention is directed to a thin film transistor, wherein a light shows a specific color after passing through the insulating film layers of the thin film transistor. The application of the thin film transistor to a liquid crystal display panel is conducive to reducing the manufacturing cost of the liquid crystal display panel.

The present invention is further directed to a pixel structure which can reduce the manufacturing cost and simplify the manufacturing process of the liquid crystal display panel.

The present invention is further directed to a liquid crystal display panel which can avoid an additional cost resulted from respectively fabricating a pixel array and a color filter array.

The present invention provides a thin film transistor disposed on a substrate. The thin film transistor comprises a gate, a semi-conductive layer, a gate insulator, a source and a drain. The gate insulator disposed between the gate and the semi-conductive layer, wherein a light shows a specific color after passing through the gate insulator. The source and the drain are disposed on the semi-conductive layer.

The present invention further provides a pixel structure disposed on a substrate. The pixel structure includes a gate, a semi-conductive layer, a gate insulator, a source, a drain, a passivation layer and a pixel electrode. The gate insulator is disposed between the gate and the semi-conductive layer. The source and the drain are disposed on the semi-conductive layer. The passivation layer at least covers the source and a portion of the drain. A light shows a specific color after passing through the passivation layer. The pixel electrode is disposed on the passivation layer and electrically connected with the drain.

In an embodiment of the present invention, the material of the gate insulator includes acrylic.

In an embodiment of the present invention, the material of the gate insulator includes color-polymethyl methacrylate (color-PMMA).

In an embodiment of the present invention, the material of the gate insulator includes an organic insulating material and at least one dye mixed in the organic insulating material.

In an embodiment of the present invention, the gate insulator includes a plurality of nano-particles. The material of the nano-particles includes titanium oxide. The percentage of titanium oxide in the gate insulator ranges from 1 to 15 wt %. Furthermore, the diameter of the nano-particles is about 20 nm.

In an embodiment of the present invention, the material of the gate insulator includes an inorganic insulating material and a plurality of quantum dots distributed in the inorganic insulating material.

According to an embodiment of the present invention, the gate insulator includes a color filter film. The color filter film includes a red filter film, a green filter film or a blue filter film. The thickness of the red filter film ranges from 6,000 Å to 15,000 Å. The thickness of the green filter film ranges from 6,000 Å to 15,000 Å. The thickness of the blue filter film ranges from 6,000 Å to 15,000 Å.

According to an embodiment of the present invention, the material of the semi-conductive layer includes an organic semi-conductive material or an inorganic semi-conductive material.

According to an embodiment of the present invention, the thin film transistor further includes a highly dielectric organic layer disposed between the gate insulating layer and the semi-conductive layer.

According to an embodiment of the present invention, the gate is disposed between the semi-conductive layer and the substrate.

According to an embodiment of the present invention, the semi-conductive layer is disposed between the gate and the substrate. The thin film transistor further includes an inner-layered insulating layer. The gate is disposed between the gate insulator and the inner-layered insulating layer.

According to an embodiment of the present invention, the material of the passivation layer includes acrylic.

In an embodiment of the present invention, the material of the passivation layer includes color-polymethyl methacrylate (color-PMMA).

In an embodiment of the present invention, the material of the passivation layer includes an organic insulating material and at least one dye mixed in the organic insulating material.

According to an embodiment of the present invention, the material of the passivation layer includes an inorganic insulating material and a plurality of quantum dots distributed in the inorganic insulating material.

According to an embodiment of the present invention, the passivation layer includes a color filter film. The color filter film includes a red filter film, a green filter film or a blue filter film.

According to an embodiment of the present invention, the thin film transistor further includes a passivation layer disposed on the drain.

The present invention further provides a thin film transistor disposed on a substrate. The thin film transistor includes a gate, a semi-conductive layer, a source, a drain, a gate insulator and an inner-layered insulating layer. The source and the drain are disposed on the semi-conductive layer. The gate insulator is disposed between the gate and the semi-conductive layer. The gate is disposed between the gate insulator and the inner-layered insulating layer. A light shows a specific color after passing through the inner-layered insulating layer.

The present invention further provides a pixel structure disposed on a substrate. The pixel structure includes a gate, a semi-conductive layer, a gate insulator, an inner-layered insulating layer, a source, a drain, a passivation layer and a pixel electrode. The semi-conductive layer is disposed between the gate and the semi-conductive layer. The gate is disposed between the gate insulator and the inner-layered insulating layer. The source and the drain are disposed on the semi-conductive layer. The passivation layer at least covers the source and a portion of the drain. A light shows a specific color after passing through at least one of the inner-layered insulating layer and the passivation layer. The pixel electrode is disposed on the passivation layer and electrically connected with the drain.

According to an embodiment of the present invention, the material of the inner-layered insulating layer includes acrylic.

According to an embodiment of the present invention, the material of the inner-layered insulating layer includes color-polymethyl methacrylate (color-PMMA).

According to an embodiment of the present embodiment, the material of the inner-layered insulating layer includes an organic insulating material and at least one dye mixed in the organic insulating material.

According to an embodiment of the present invention, the inner-layered insulating layer includes a plurality of nano-particles. The material of the nano-particles includes titanium oxide. The percentage of titanium oxide in the inner-layered insulating layer ranges from 1 to 15 wt %. Furthermore, the diameter of the nano-particles is about 20 nm.

According to an embodiment of the present invention, the material of the inner-layered insulating layer includes an inorganic insulating material and a plurality of quantum dots distributed in the inorganic insulating material.

According to an embodiment of the present invention, the inner-layered insulating layer includes a color filter film. The color filter film includes a red filter film, a green filter film or a blue filter film. The thickness of the red filter film ranges from 6,000 Å to 15,000 Å. The thickness of the green filter film ranges from 6,000 Å to 15,000 Å. The thickness of the blue filter film ranges from 6,000 Å to 15,000 Å.

According to an embodiment of the present invention, the material of the semi-conductive layer includes an organic semi-conductive material or an inorganic semi-conductive material.

According to an embodiment of the present invention, the thin film transistor further includes a highly dielectric organic layer disposed between the gate insulator and the semi-conductive layer.

According to an embodiment of the present invention, the gate is disposed between the semi-conductive layer and the substrate.

According to an embodiment of the present invention, the semi-conductive layer is disposed between the gate and the substrate. The gate is disposed between the gate insulator and the inner-layered insulating layer.

According to an embodiment of the present invention, the material of the passivation layer includes resin.

According to an embodiment of the present invention, the material of the passivation layer includes color-polymethyl methacrylate (color-PMMA).

According to an embodiment of the present invention, the material of the passivation layer includes an organic insulating material and at least one dye mixed in the organic insulating material.

According to an embodiment of the present invention, the material of the passivation layer includes an inorganic insulating material and a plurality of quantum dots distributed in the inorganic insulating material.

According to an embodiment of the present invention, the passivation layer includes a color filter film. The color filter film includes a red filter film, a green filter film or a blue filter film.

According to the present invention, an insulating material having a light-filtering effect or a color-changing effect is used to fabricate the insulating film layer in the thin film transistor. Therefore, the light can show the specific color after passing through the insulating film layer of the thin film transistor. In addition, according to the present invention, the passivation layer in the pixel structure can be fabricated by using a similar material as described above. Therefore, the light can show the specific color after passing through the pixel structure. In other words, the pixel structure of the present invention can display colorful images without the need of disposing a color filter additionally. According to the present invention, the liquid crystal display panel has the aforesaid pixel structure, so the step of fabricating a color filter array can be eliminated from the manufacturing process of the liquid crystal display panel, thereby reducing a manufacturing cost.

In order to the make the aforementioned and other objects, features and advantages of the present invention more comprehensible, several embodiments accompanied with figures are described in detail below.

DESCRIPTION OF EMBODIMENTS

In a conventional thin film transistor, an insulating layer or multiple insulating layers must be disposed for electrically insulating a gate from a source, a drain and a channel layer. Due to the fact that a variety of insulating materials can have a color-changing effect or a light-filtering effect, the present invention is directed to fabricating the insulating film layer of a thin film transistor and a pixel structure by using such insulating materials. Therefore, the light can show a specific color after passing through the thin film transistor, the pixel structure and related devices of the present invention.

Figure 1:
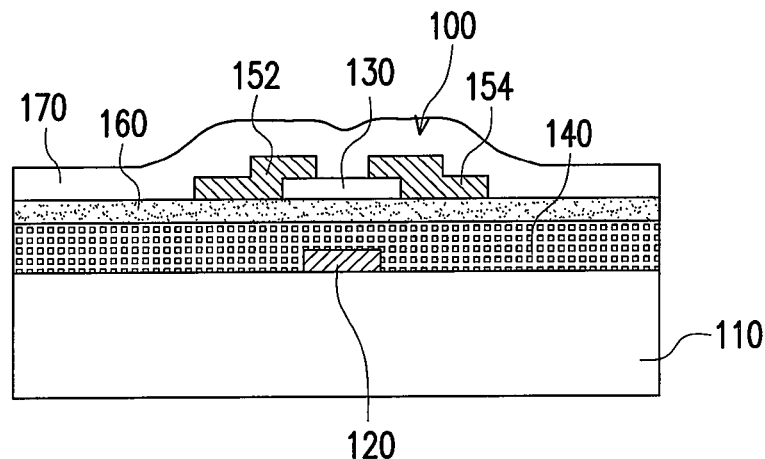
FIG. 1 is a thin film transistor according to an embodiment of the present invention.

FIG. 1 illustrates a thin film transistor according to an embodiment of the present invention. Referring to FIG. 1, a thin film transistor 100 is disposed on a substrate 110. The thin film transistor 100 includes a gate 120, a semi-conductive layer 130, a gate insulator 140, a source 152 and a drain 154. The gate insulator 140 disposed between the gate 120 and the semi-conductive layer 130, wherein a light shows a specific color after passing through the gate insulator 140. The source 152 and the drain 154 are disposed on the semi-conductive layer 130. The source 152 and the drain 154 are respectively disposed at two sides of the gate 120. Accordingly, the specific color of the light can be any color recognizable by human eyes, such as red, green, blue, yellow and so forth.

In the present embodiment, the gate 120 is disposed between the substrate 110 and the semi-conductive layer 130, for example. In a different embodiment, the semi-conductive layer 130 can be disposed between the substrate 110 and the gate 120. Furthermore, the material of the gate insulator 140 is resin, for example, resin may include acrylic or color filter films. More specifically, acrylic can be classified into various types. Acrylic used in the present embodiment is color-polymethyl methacrylate (color-PMMA), for example. Color-PMMA is mainly constituted by a color-changing group bonded in a chemical structure of polymethyl methacrylate, and thereby enables the light to show the specific color after passing through color-PMMA. Some of the structures of the color-PMMA had been disclosed, for example, in the reference: R. M. Christie, C. H. Lui, 1999. Studies of fluorescent dyes: part 1. An investigation of the electronic spectral properties of substituted coumarins, *Dye and Pigment* 42 85-93pp.

Besides, the gate insulator 140 can be fabricated by using other materials, such as an organic insulating material and at least one dye mixed in the organic insulating material. Various types of the dye had been known. According to the present embodiment, the dye can be, for example, that used in an organic light emitting device (OLED). In a different embodiment, the material of the gate insulator 140 can also be another dye mixed in an organic insulating material.

Certainly, the gate insulator 140 in the thin film transistor 100 can be fabricated by using an inorganic material, such as silicon oxide, silicon nitride, silicon oxynitride, and so forth. Therefore, by merely forming a plurality of quantum dots in the inorganic insulating material, the light can show various colors after passing through the gate insulator 140. The quantum dots are, for example, SeS, CdS, and so forth. Some of the material of the semi-conductive layer 130 of the thin film transistor 100 had been disclosed, for example, in the reference: Jae Kyeong Jeong et al. 2007, High performance thin film transistor with cosputtered amorphous indium gallium zinc oxide channel, Applied Physics Letters 91, 113505.

In details, in order to make the light show various colors after passing through the gate insulator 140, the gate insulator 140 can be fabricated by using the method of fabricating a color filter array. In other words, the gate insulator 140 can be fabricated by performing an ink-jet printing process to form a color filter film between the gate 120 and the semi-conductive layer 130. The common color filter film includes a red filter film, a green filter film, a blue filter film or a filter film with a different color. If using the red filter film as the gate insulator 140, the thickness thereof ranges from 6,000 Å~15,000 Å. If using the green filter film as the gate insulator 140, the thickness thereof ranges from 6,000 Å~15,000 Å. If using the blue filter film as the gate insulator 140, the thickness thereof ranges from 6,000 Å~15,000 Å.

Furthermore, the gate insulator 140 can include a plurality of nano-particles to avoid the glare. The diameter of the nano-particles is about 20 nm. The material of the nano-particles includes titanium oxide. The percentage of titanium oxide in the gate insulator 140 ranges from 1 to 15 wt %. In addition, in order to enhance an electric property of the thin film transistor 100, a highly dielectric organic layer 160 can be disposed between the gate insulator 140 and the semi-conductive layer 130. More specifically, the highly dielectric organic layer 160 in the present embodiment is composed of, for example, a fluorine-containing organic material with a dielectric constant about 6 and the thickness about 3,000 Å.

In the present embodiment, the thickness of the gate insulator 140 can be adjusted according to different demands, and thereby the light can show colors in different degrees of color saturation after passing through the gate insulator 140. Furthermore, the gate 120, the source 152, and the drain 154 can be fabricated by using a single metal layer or a multilayer metal layer. In order to increase a light transmittance ratio of the thin film transistor 100, a transparent conductive material can also be used to fabricate the gate 120, the source 152 and the drain 154. The transparent conductive material is, for example, indium tin oxide, indium zinc oxide, or the like. Additionally, the material of the semi-conductive layer 130 can be an inorganic semi-conductive material or an organic semi-conductive material. The material of the inorganic semi-conductive material is, for example, amorphous silicon. The organic semi-conductive material is composed of, for example, pentacene. Under the circumstance that the semi-conductive layer 130 is disposed between the substrate 100 and the gate 120, the material of the semi-conductive layer 130 can further be poly-crystalline silicon. Furthermore, in order to protect the thin film transistor 100, a passivation layer 170 can be disposed over the source 152 and the drain 154.

Figure 2:
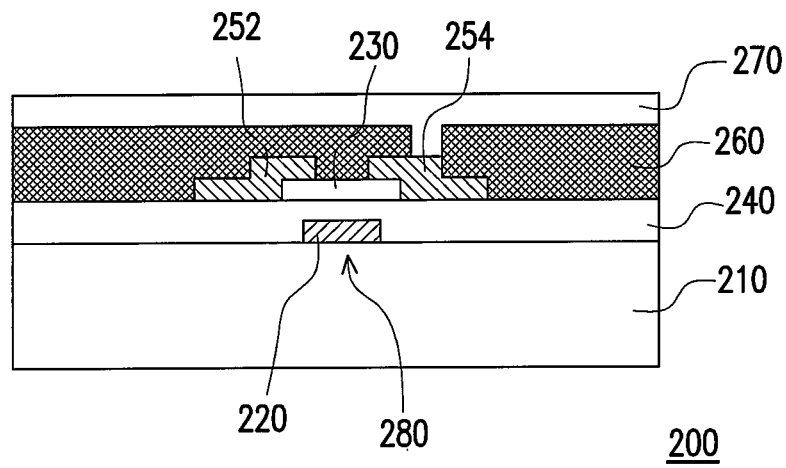
FIG. 2 is a pixel structure according to an embodiment of the present invention.

FIG. 2 is a pixel structure according to an embodiment of the present invention. Referring to FIG. 2, the pixel structure 200 is disposed on a substrate 210. The pixel structure 200 includes a gate 220, a semi-conductive layer 230, a gate insulator 240, a source 252, a drain 254, a passivation layer 260 and a pixel electrode 270. A thin film transistor 280 is constituted by the gate 220, the semi-conductive layer 230, the gate insulator 240, the source 252 and the drain 254. The passivation layer 260 at least covers the source 252 and a portion of the drain 254. The pixel electrode 270 is disposed on the passivation layer 260 and electrically connected with the drain 254. Moreover, a light can show a specific color after passing through at least one of the gate insulator 240 and the passivation layer 260.

In the present embodiment, the gate insulator 240 can be fabricated by using the same material as that of the gate insulator 140 described in the aforesaid embodiment. Thereby, the light can show a specific color after passing through the gate insulator 240. Furthermore, the gate insulator 240 can be fabricated by using a transparent insulating material, and thereby the light shows a specific color only after passing through the passivation layer 260.

Under the circumstance that the light shows a specific color only after passing through the passivation layer 260, the material of the passivation layer 260 includes resin, such as acrylic including color-PMMA. Otherwise, the material of the passivation layer 260 can include an organic insulating material and a dye mixed in the organic insulating material. The material of the passivation layer 260 can even be an inorganic insulating material and a plurality of quantum dots distributed in the inorganic insulating material. In addition, the passivation layer 260 can be a color filter film, wherein the color filter film includes a red filter film, a green filter film or a blue filter film.

Certainly, the present embodiment does not exclude a circumstance that the light can show a specific color after passing through both the gate insulator 240 and the passivation layer 260. In other words, the gate insulator 240 and the passivation layer 260 can simultaneously serve as an insulating film layer having a color-changing effect or a light-filtering effect. When the pixel structure 200 is applied to a liquid crystal display panel, the liquid crystal display panel can display colorful images without the need of fabricating a color filter array additionally. Therefore, by applying the pixel structure 200 to the liquid crystal display panel, a manufacturing cost of the liquid crystal display panel is reduced and a manufacturing process of the liquid crystal display panel is simplified.

Figure 3:
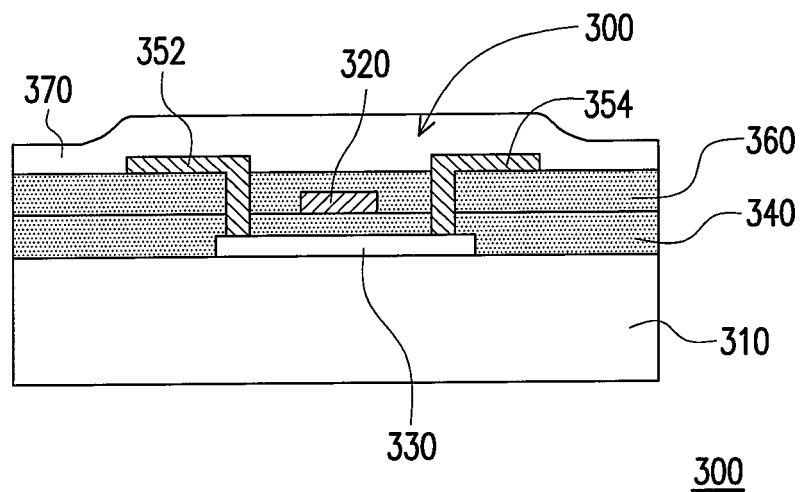
FIG. 3 is the thin film transistor according to another embodiment of the present invention.

FIG. 3 is a thin film transistor according to another embodiment of the present invention. Referring to FIG. 3, the thin film transistor 300 is disposed on the substrate 310. The thin film transistor 300 includes a gate 320, a semi-conductive layer 330, a gate insulator 340, a source 352, a drain 354 and an inner-layered insulating layer 360. The source 352 and the drain 354 are disposed on the semi-conductive layer 330 and at two sides of the gate 320. The gate insulator 340 is disposed between the gate 320 and the semi-conductive layer 330. The gate 320 is disposed between the gate insulator 340 and the inner-layered insulating layer 360. A light shows a specific color after passing through at least one of the inner-layered insulating layer 360 and the gate insulator 340.

If the light shows a specific color after passing through the gate insulator 340, the gate insulator 340 of the thin film transistor 300 can be constituted by the material the same as that of the gate insulator 140 of the thin film transistor 100. Similarly, if the light shows a specific color only after passing through the inner-layered insulating layer 360, the inner-layered insulating layer 360 can be fabricated by using the material the same as that of the gate insulator 140 of the thin film transistor 100. Certainly, the inner-layered insulating layer 360 and the gate insulator 340 can simultaneously serve as an insulating film layer having a color-changing effect or a light-filtering effect. Under the situation, materials of the inner-layered insulating layer 360 and the gate insulator 340 can simultaneously include a color-filter film, an organic insulating material containing a dye, an inorganic insulating material containing quantum dots, color-PMMA, or the like. Furthermore, in order to protect the thin film transistor 300, a passivation layer 370 can be disposed over the source 352 and the drain 354. In other words, one or more of the gate insulator 340, the inner-layered insulating layer 360 and the passivation layer 370 may have the material shown above, which may be color-polymethyl methacrylate, an organic insulating material, at least one dye mixed in the organic insulating material, color filter film including a red filter film, a green filter film or a blue filter film, an inorganic insulating material, a plurality of quantum dots distributed in the inorganic insulating material, or the combinations thereof, for having a color-changing effect or a light-filtering effect.

Figure 4:
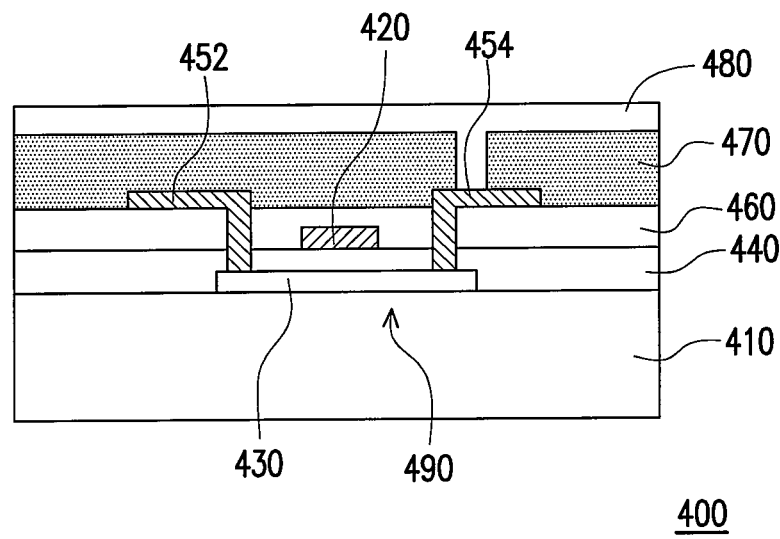
FIG. 4 is the pixel structure according to another embodiment of the present invention.

FIG. 4 is a pixel structure according to another embodiment of the present invention. Referring to FIG. 4, the pixel structure 400 is disposed on a substrate 410. The pixel structure 400 includes a gate 420, a semi-conductive layer 430, a gate insulator 440, a source 452, a drain 454, an inner-layered insulating layer 460, a passivation layer 470 and a pixel electrode 480. A thin film transistor 490 is constituted by the gate 420, the semi-conductive layer 430, the gate insulator 440, the source 452, the drain 454 and the inner-layered insulating layer 460. The passivation layer 470 covers the source 452 and a portion of the drain 454. The pixel electrode 480 is disposed on the passivation layer 470 and electrically connected with the drain 454. A light shows a specific color after passing through at least one of the inner-layered insulating layer 460, the gate insulator 440 and the passivation layer 470.

More specifically, in the pixel structure 400 of the present embodiment, the inner-layered insulating layer 460 and the gate insulator 440 can be fabricated by using the material of the gate insulator 140 as described in the aforesaid embodiment. The passivation layer 470 can be fabricated by using the material of the passivation layer 260 as described in the aforesaid embodiment. In other words, any single layer or multiple layers selected from the inner-layered insulating layer 460, the gate insulator 440 and the passivation layer 470 can have a color-changing effect or a light-filtering effect. Under the circumstance that the passivation layer 470 has the color-changing effect or the light-filtering effect, the inner-layered insulating layer 460 and the gate insulator 440 can be fabricated by using a transparent material, and vice versa. Moreover, in order to enhance an electric property of the thin film transistor 490, a highly dielectric organic layer can be disposed between the gate insulator 440 and the semi-conductive layer 430.

According to the present embodiment, the light can show a specific color after passing through an insulating film layer of the pixel structure 400. Therefore, a manufacturing process and a manufacturing cost of a color filter array can be saved by applying the pixel structure 400 to a liquid crystal display panel. A pixel array constituted by an array of the pixel structure 400 can display colorful images without cooperating with the color filter array. Therefore, by applying the pixel structure 400 to the liquid crystal display panel, misalignment is avoided and high process yield is obtained.

Figure 5:
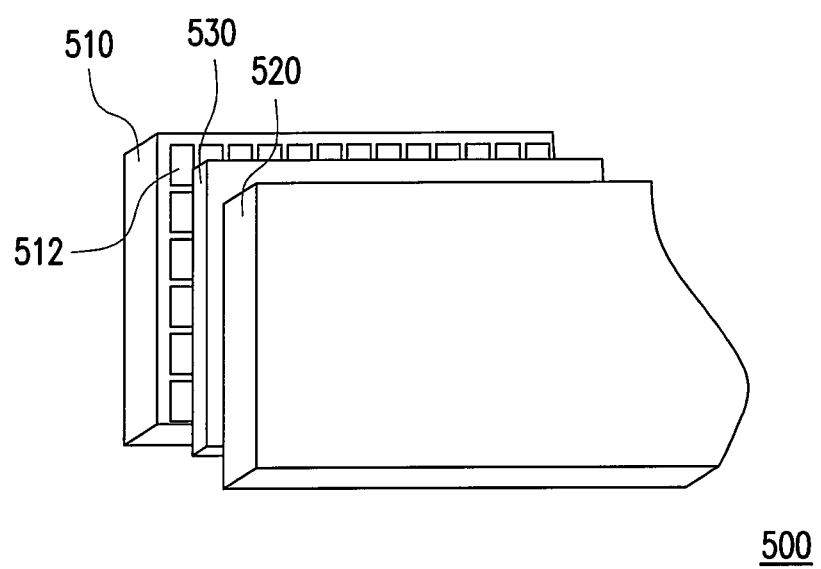
FIG. 5 is a schematic view of a liquid crystal display panel according to an embodiment of the present invention.

FIG. 5 illustrates a schematic view of a liquid crystal display panel according to an embodiment of the present invention. Referring to FIG. 5, a liquid crystal display panel 500 includes a first substrate 510, a second substrate 520 and a liquid crystal layer 530. The first substrate 510 has a plurality of pixel structures 512. A light shows a specific color after passing through each of the pixel structures 512. The second substrate 520 is disposed opposite to the first substrate 510. The liquid crystal layer 530 is disposed between the first substrate 510 and the second substrate 520. The pixel structure 512 can be the pixel structure 200 or the pixel structure 400 as cited in any of the aforesaid embodiments. In other words, every insulating film layer in the pixel structure 512 can be fabricated by using an insulating material having a color-changing effect or a light-filtering effect. It should be noted that an array of the pixel structure 512 in the liquid crystal display panel 500 does not need to be disposed corresponding to a color filter array. Therefore, the misalignment which occurs when assembling the first substrate 510 and the second substrate 520 is prevented effectively, and thereby higher process yield is obtained. Also, because a process of fabricating the color filter array is eliminated from a manufacturing process of the liquid crystal display panel 500, the manufacturing process is simplified and a manufacturing cost is reduced.

In summary, according to the present invention, the thin film transistor, the pixel structure and the liquid crystal display panel at least include advantages as follows. The insulating film layers of the thin film transistor and the pixel structure according to the present invention can have the color-changing effect or the light-filtering effect, and thereby the light can show the specific color after passing through these insulating film layers. The liquid crystal display panel can be fabricated without disposing the color filter array additionally, and thereby the manufacturing process is simplified and the manufacturing cost is reduced. Furthermore, the misalignment which occurs when assembling the first substrate and the second substrate can be effectively prevented, so as to obtain the higher process yield.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A thin film transistor disposed on a substrate, the thin film transistor comprising:
    a gate;
    a semi-conductive layer;
    a gate insulator disposed between the gate and the semi-conductive layer, wherein a light of one color shows a different color after passing through the gate insulator, wherein a material of the gate insulator comprises an inorganic insulating material having a plurality of quantum dots distributed therein and a material of the quantum dots is SeS;
    a dielectric organic layer disposed between the gate insulator and the semi-conductive layer, wherein a dielectric constant of the dielectric organic layer is 6; and
    a source and a drain disposed on the semi-conductive layer.

2. The thin film transistor according to claim 1, wherein the gate insulator comprises a plurality of nano-particles.

3. The thin film transistor according to claim 2, wherein the material of the nano-particles comprises titanium oxide.

4. The thin film transistor according to claim 3, wherein the percentage of titanium oxide in the gate insulator ranges from 1 to 15 wt %.

5. The thin film transistor according to claim 1, wherein the material of the semi-conductive layer comprises an organic semi-conductive material or an inorganic semi-conductive material.

6. The thin film transistor according to claim 1, wherein the gate is disposed between the semi-conductive layer and the substrate.

7. A pixel structure disposed on a substrate, comprising:
    the thin film transistor as claim 1;
    a passivation layer covering the source and a portion of the drain, wherein a light shows a specific color after passing through the passivation layer; and
    a pixel electrode disposed on the passivation layer and electrically connected with the drain.

8. The pixel structure according to claim 7, wherein the gate insulator further comprises a plurality of nano-particles.

9. The pixel structure according to claim 8, wherein the material of the nano-particles comprises titanium oxide.

10. The pixel structure according to claim 9, wherein the percentage of titanium oxide in the gate insulator ranges from about 1 to 15 wt%.

11. The pixel structure according to claim 7, wherein the material of the semi-conductive layer comprises an organic semi-conductive material or an inorganic semi-conductive material.

12. The pixel structure according to claim 7, wherein the gate is between the semi-conductive layer and the substrate.

13. A thin film transistor disposed on a substrate, the thin film transistor comprising:
    a gate;
    a semi-conductive layer;
    a gate insulator disposed between the gate and the semi-conductive layer, wherein a material of the gate insulator comprises an inorganic insulating material having a plurality of quantum dots distributed therein and a material of the quantum dots is SeS;
    a dielectric organic layer disposed between the gate insulator and the semi-conductive layer, such that the gate insulator is separated from the semi-conductive layer through the dielectric organic layer, wherein a dielectric constant of the dielectric organic layer is 6; and
    a source and a drain disposed on the semi-conductive layer.

14. The thin film transistor according to claim 13, further comprising a passivation layer disposed over the source and the drain, wherein the passivation layer contacts all of the source, the drain, the semi-conductive layer and the dielectric organic layer.

15. A thin film transistor disposed on a substrate, the thin film transistor comprising:
    a gate;
    a semi-conductive layer;
    a gate insulator disposed between the gate and the semi-conductive layer, wherein a material of the gate insulator comprises an inorganic insulating material having a plurality of quantum dots distributed therein and a material of the quantum dots is SeS;
    a dielectric organic layer disposed between the gate and the semi-conductive layer, wherein the dielectric organic layer contains fluorine, and wherein a dielectric constant of the dielectric organic layer is 6; and
    a source and a drain disposed on the semi-conductive layer.

* * * * *